United States Patent [19]

Farrar et al.

[11] Patent Number: 4,759,856
[45] Date of Patent: Jul. 26, 1988

[54] FLOCCULATION PROCESSES

[75] Inventors: David Farrar; John R. Field; Peter Flesher, all of West Yorkshire; Tony Whittaker, South Yorkshire, all of England

[73] Assignee: Allied Colloids, Ltd., England

[21] Appl. No.: 855,519

[22] Filed: Apr. 23, 1986

Related U.S. Application Data

[63] Continuation-in-part of Ser. No. 728,782, Apr. 30, 1985.

[30] Foreign Application Priority Data

| Apr. 30, 1984 | [GB] | United Kingdom | 8410971 |
| Apr. 25, 1985 | [GB] | United Kingdom | 8510496 |
| Oct. 29, 1985 | [GB] | United Kingdom | 8526624 |

[51] Int. Cl.⁴ .............................................. C02F 1/56
[52] U.S. Cl. .................................... 210/734; 210/732; 210/738; 523/322; 524/922
[58] Field of Search ............... 210/725, 727, 728, 730, 210/732–736, 738; 523/319, 322, 323; 524/922; 525/326.1, 329.4

[56] References Cited

U.S. PATENT DOCUMENTS

| 3,235,490 | 2/1966 | Goren | 210/734 |
| 3,380,947 | 4/1968 | Galgoczi et al. | 523/323 |
| 3,488,720 | 1/1970 | Nagy et al. | 210/734 |
| 3,536,646 | 10/1970 | Hatch et al. | 523/322 |
| 3,624,019 | 11/1971 | Anderson et al. | 210/734 |
| 3,719,748 | 3/1973 | Manfroy et al. | 210/734 |
| 3,917,529 | 11/1975 | Madole et al. | 210/738 |
| 3,968,037 | 7/1976 | Morgan et al. | 210/734 |
| 3,977,971 | 8/1976 | Quinn et al. | 210/738 |
| 4,051,065 | 9/1977 | Venema | 422/261 |
| 4,113,688 | 9/1978 | Pearson | 524/922 |
| 4,172,066 | 10/1979 | Zweigle et al. | 525/329.4 |
| 4,382,864 | 5/1983 | Hashimoto et al. | 210/730 |
| 4,529,794 | 7/1985 | Sortwell et al. | 528/499 |

Primary Examiner—Peter Hruskoci
Attorney, Agent, or Firm—Ostrolenk, Faber, Gerb & Soffen

[57] ABSTRACT

A cross linked high molecular weight polymer formed from a water soluble monomer or blend of monomers and which has IV and/or solubility and/or rheology properties indicating that it would be unsuitable for use as a flocculant can be used as a flocculant after shearing the polymeric material. The shearing may be applied to the polymeric material before addition to the suspension that is to be flocculated or can be applied to the suspension that is being flocculated. The shearing increases the intrinsic viscosity of the polymeric material and can improve its rheology and solubility. The polymeric material must be of high molecular weight.

23 Claims, 4 Drawing Sheets

FLOCCULATION PROCESSES

This application is a continuation-in-part of application Ser. No. 728,782 filed Apr. 30, 1985.

When synthetic polymers of water soluble monomers or monomer blends were first introduced as flocculants, in the early to mid-1950's, maximum molecular weights were relatively low compared to the present day. The initial polymers typically had molecular weights well below 500,000 and thus were of a value comparable to the molecular weight now associated with coagulants, rather than high molecular weight flocculants. These low molecular weights were probably caused by the presence of chain transfer agents and other impurities in the monomer or polymerisation mixture.

It was recognised that the polymers had to be in solution and if the polymers were not, despite their low molecular weight, spontaneously soluble in water (for instance due to excessive cross linking) it was appreciated to be necessary to homogenise them so as to put them into solution. For instance Miller described in U.S. Pat. No. 3,021,269 ultrasonic degradation of a highly cross linked insoluble polymer gel "having almost infinite molecular weight" to render it water soluble as a result of severing the polymeric structure. The end products were always of relatively low molecular weight and the highest quoted molecular weight for the end product is 630,000 and the highest intrinsic viscosity (IV) 2.54 dl/g.

Similarly, Goren described in a 1954 patent application (published as U.S. Pat. No. 3,235,490) dispersing various polymer gels into water using a Waring Blendor. Many of the gels were cross linked spontaneously or by the addition of cross linking agent and the cross linking appears to have caused the formation of some wholly insoluble, non-swellable, polymer that settled out of solution. Solutions of the polymers were also subjected to homogenisation in a hand homogeniser and it was observed that the effect on agglomeration performance of this homogenisation is drastic, with most of the products being useless after homogenisation. Again, all the polymers were of very low molecular weight as is indicated by the fact that the highest specific viscosity (measured by a capillary flow viscometer at 34° C. on a 0.5% solution in deionised water) is quoted as 0.77. This compares to values of well over 100, and usually over 1000, for modern high molecular weight flocculants.

Some polymers having molecular weights typical of those described by Miller and Goren can be used as coagulants, for instance for coagulating very fine suspended solids, e.g., for clearing turbidity or removing colour from aqueous solutions. For instance typical modern polymer coagulants have a molecular weight of up to about 500,000. Typical polymer coagulants may be formed by reaction of epichlorhydrin with dimethylamine. Since the resultant linear product may have extremely low molecular weight, it is known to include ethylene diamine in order to increase molecular weight by cross linking without rendering the polymer insoluble.

Goren postulated that agglomeration involved electrostatic attraction followed by a sweeping action of a filamentary network of the cross linked polymer. This mechanism has come to be recognised as the classical mechanism of coagulating turbidity and colour, namely very fine suspended solids. Goren made his polymer by bulk polymerisation followed by comminution and showed that his aqueous compositions tended to be non-homogeneous, in that there was a tendency for insoluble polymer to precipitate from the solution. Goren warned against cross linking too much and indicated that the optimum was the level at which the polymer is still readily dispersible in water. Since Goren was postulating a sweeping action by filamentary molecular networks this indicates that his dispersibility had to be on a molecular scale, i.e., true solution. Goren warned that the agglomerating effect of the polymer can be destroyed by homogenising it (column 13 line 74).

In contrast to these low molecular weight polymer coagulants, modern flocculants (for flocculating suspended solids such as sewage) are linear polymers of very high molecular weight. Most have an intrinsic viscosity above 4 and often above 10. The polymers have to be linear since cross linking renders them ineffective and often insoluble, although trivial amounts of cross linking may exist without detracting from the polymer properties (see for instance U.S. Pat. No. 3,557,061 column 3 line 35).

Whether or not a high molecular weight polymer is suitable for use as a flocculant is determined in part by observing the rheology of aqueous compositions of the polymer. Satisfactory polymers give a "long" or "stringy" rheology. This is recognised in the art and can be demonstrated in that when a 1% stable homogeneous composition of the polymer in deionised water is formed by conventional techniques, such as by stirring using a slowly rotating stirrer followed by ageing, and a glass rod is manually pulled endwise out of the solution the rod draws a long thread of composition with it. The thread is generally at least 5 cm long and the polymer can then be described as having a rheology of 5 cm. Often the rheology is above 10 cm. If, in contrast to this, the polymer gives a "short" or "granular" rheology (i.e., in the above test the rod pulls substantially no thread, for instance below 5 cm and often below 2 cm, of composition) the polymer will be rejected and will not be used as a flocculant. Experience has shown that polymers giving this short rheology are unsatisfactory in conventional flocculation processes since it indicates a high degree of cross-linking and/or a low molecular weight. The short polymers can also be characterised as non-film forming, in that when an aqueous composition is dried it does not form a film.

Similarly, the polymer is rejected if it has a large particle size and is cross linked sufficient to ensure that insoluble solid polymer does not go into stable suspension in the aqueous composition.

The stable homogeneous composition is stable in the sense that the polymer is in full equilibrium with the water, i.e., it has reached its ultimate degree of solution or swelling, for instance as a result of ageing for two hours or more. It is homogeneous in the sense that the polymer remains uniformly dispersed throughout the composition (usually in the total absence of dispersing agent although minor amounts may be present as a result of the manufacture of the polymer) with no tendency for material to precipitate from the composition on standing for a few days.

The unsuitability as flocculants of short rheology polymers (as defined above) and of polymers that do not go into stable suspension or solution are well understood in the art. Very high molecular weight, linear, truly dissolved, polymers are preferred.

Certain high molecular weight polymers, for instance polymers of Mannich bases, have a tendency to cross link spontaneously and acquire a rather short or very short rheology or become totally insoluble. It frequently happens that high molecular weight polymers are produced which have rheology that is shorter than is desirable. Polymers of very short rheology (below 2 cm), or that are insoluble, are rejected. Polymers with longer, but still rather poor, rheology may be used under the same conditions as if they had the desired long rheology but this leads to poor performance properties.

Polymers for use as flocculants are often supplied as powders or as dispersions in water-immiscible liquid and these polymers are converted to an aqueous solution by adding the powder or dispersion to water with initial agitation to promote distribution throughout the water, and then leaving the mixture to age for, for instance, an hour or more. During the ageing process low levels of agitation may be applied.

The need to avoid shearing the polymer is well established and is described in, for instance, Katzer U.S. Pat. No. 3,468,322. In EP 0102759, high shear is applied but it is said to be essential that it is applied for only a very short time (much less than 1 second) and so the shear does not have any effect on the structure of the polymer.

Flocculant polymer may alternatively be supplied as a concentrated solution, in which event it may be diluted to form the desired dilute solution by stirring with water, again using low levels of agitation.

Once the polymer has reached equilibrium with the water is it accepted that it must not be subjected to vigorous agitation, since it has been believed that this will damage the properties of the solution.

Many flocculation processes involve little or no agitation during the flocculation. For instance the flocculant solution may be added with gentle stirring to the suspension that is to be flocculated and the mix then allowed to stand. If flocculation is one step of a multistage process including steps which involve vigorous agitation, it is normal to add the flocculant after these earlier agitation steps, so as to avoid damaging the floc. For instance when the polymer is being used as a retention or dewatering aid in the production of paper the flocculant solution is generally added to the stock immediately prior to the screen through which the pulp is dewatered by drainage. In some dewatering processes, such as centrifugal dewatering, shear is inevitably applied during the dewatering stage but extra agitation or shear before dewatering is avoided.

It is therefore well established in the art of high molecular weight flocculant polymers that shear should not be applied to the polymers or flocs that are formed. If it is found that a polymer does not dissolve spontaneously into water by conventional techniques, for instance involving gentle stirring, then conventional practice is to reject the polymer as unsuitable for use as a flocculant. For instance, no attempt is ever made to modify the rheology of the polymer. If after reaching equilibrium with the water the solution of the polymer is shorter than normal, then either the polymer is used in that state or, if the rheology is too short, the polymer is rejected.

In our European patent application No. 85302925.4 (not published at the priority date of this application), we describe the surprising discovery that improved flocculation performance can be obtained from a solution of a polymeric flocculant if that solution is subjected to shear before use. We explain that the shear may result in reduction of the range of molecular weights within the solution and/or reduction in the intrinsic viscosity of the polymer within the solution and/or an increase in the measured ionicity of the polymer in the solution. Thus the shear could, and frequently did, result in reduction in intrinsic viscosity (and therefore of molecular weight) but the performance properties are improved because of other changes, notably a reduction in the range of molecular weights within the solution. This reduction in intrinsic viscosity is consistent with accepted thinking that the application of shear to a high molecular weight polymer will reduce molecular weight and intrinsic viscosity, for instance by breaking the linear chains.

It would be desirable to be able to improve the performance properties of polymers that have been accidentally or deliberately cross linked to a short rheology and/or to an intrinsic viscosity that is lower than is desired.

When using linear polymers having long rheology, the resultant flocs tend to be unstable to shear and/or performance is very dose sensitive. It would be desirable to be able to obtain flocs of higher shear resistance, especially by a process that is not so sensitive to dosage.

A flocculation process according to the invention is one in which a polymeric material is added to water to form an aqueous composition and is used to flocculate the suspended solids of an aqueous suspension, the polymeric material is a high molecular weight polymeric material formed from a water soluble monomer or blend of monomers, and the polymeric material is subjected to shear and the process is characterised in that the shearing is applied before or during flocculation and the polymeric material comprises cross linked water swellable polymer that can be sheared to an intrinsic viscosity of at least 4 dl/g and the aqueous composition of the polymeric material (a) is or can be a stable homogeneous composition and the shearing causes an increase in intrinsic viscosity of at least 1 dl/g and/or (b) includes non-dispersible, insoluble, polymer and the shearing converts it to a stable homogeneous aqueous composition.

The invention is based on the surprising discovery that it is easily possible to shear very high molecular weight cross linked polymer formed from water soluble monomer or monomer blend without reducing intrinsic viscosity and producing a low molecular weight product. Indeed IV can easily be increased by at least 1 dl/g and often more. This is directly contrary to the teachings of Miller and Goren who both had polymers in which the chain length was too short. In the invention, the chain length must be such that IV either is above 4 dl/g after the shearing or can be raised to above 4 dl/g by further shearing.

The process can involve converting a wholly insoluble polymer, that will not form a stable homogeneous aqueous composition on gentle stirring and ageing (because of excessive cross linking) and that is therefore non-dispersible in water, into a stable homogeneous aqueous composition. The IV of the insoluble polymer cannot be measured but the shearing generally results in a final IV of above 4 and/or results in IV increasing by at least 1 dl/g after the polymer is put into a stable homogeneous aqueous composition and before shearing is terminated.

Preferably the process of the invention involves shearing an aqueous stable homogeneous composition to cause an increase of at least 1 dl/g in IV. The composition may be formed by shearing insoluble polymer as discussed above or may be formed by shearing an aqueous composition that is not a stable homogeneous composition (for instance because it has not aged sufficiently) even though the polymer can form such a composition upon ageing and/or gentle stirring.

The polymeric material that is used to form the composition includes cross linked polymeric material that will swell in water and may also include polymeric material that is soluble in water, for instance being a blend of soluble polymer with swellable, insoluble, polymer. Any soluble material is generally present in a minor amount (below 50%) and often below 20% of total polymer.

In the process of the invention the polymeric material is generally such that if it is put in the form of a stable aqueous homogeneous composition of a concentration of 1% by weight in deionised water then this composition will generally have a rheology of below 2 cm and generally below 1 cm, i.e., it will be very short, and will usually be non-film forming.

A dried coating of the aqueous composition before the shearing will contain, and may consist substantially only of, discrete polymer particles.

After the shearings the polymer will usually have long (above 5 and usually above 10 cm) rheology and may be wholly soluble in water and may be wholly film forming.

During the process of the invention the polymeric material is subjected to shearing, preferably before flocculation. The final intrinsic viscosity can vary widely from, for instance, 2 up to 6, 10 or much higher. The polymeric material can, before the shearing, have IV above 4, in which event the shearing will cause IV to rise to a higher value above 4, or it can have an IV below 4 and the final IV typically is above 6. Even if the shearing does not result in the polymeric material having a final IV of above 4, the polymeric material must be such that shearing the polymeric material can increase IV to a value above 4. For instance even though the process may convert an insoluble polymer to a swellable polymer of IV 3 or may cause the IV of a swellable polymer to increase from, for instance, 2 to 3.5, the polymeric material must be such that further shearing could have lifted the IV to above 4.

The process of the invention can give very good flocculation performance even though the IV of the polymeric material and/or the rheology of the initial polymeric material (1% composition below 2 cm) and/or the solubility is such that the polymeric material would previously have been rejected as useless. It seems probable that the shearing is breaking cross links, so as to increase the proportion of soluble polymer, without significantly breaking chain lengths, and that the increase in IV follows from this increased proportion of truly soluble polymer.

Throughout this specification IV is measured at 25° C. in 3M NaCl according to the method described in Encyclopedia of Polymer Science and Technology, Editors Mark and Gaylord, published John Wiley & Sons, 1971, Volume 14, pages 717 to 740. If it is necessary, but difficult, to measure IV in a sheared flocculated suspension then the IV that is considered is the IV determined after subjecting the polymer to the same shearing conditions as the suspension (e.g., the same centrifuge at the same rotational velocity) at the same concentration as in the suspension but in the absence of suspended or flocculated solids.

One principal advantage of the invention therefore is that it permits the conversion of a cross linked polymer that would normally have been rejected or that would have been expected to have given poor flocculation properties to a form in which it will give very good flocculation properties. These properties are generally at least as good as the properties of a comparable polymer having the same final rheology and IV but which had been made by dissolving a truly linear polymer instead of a cross linked polymer followed by shearing. The process of the invention thus permits use of compositions that have been spontaneously or accidentally cross linked to a state at which they would previously have been considered unsatisfactory.

It is usually preferred for the intrinsic viscosity of the polymeric material to be increased by subjecting an aqueous composition of the polymeric material to the shear and then adding this aqueous composition to the suspension.

The shear may be applied by subjecting the composition to the effect of fast moving blades, for instance blades having a velocity of at least 500 meters per minute, typically 750 to 5,000 meters per minute. If the blades rotate, then these velocities are the peripheral velocities of the blades. It is particularly preferred to use blades that rotate at high speed, generally above 2,000 rpm preferably 3,000 to 20,000 rpm. Suitable apparatus for this is the Waring Blendor or apparatus similar to large scale versions of kitchen blenders such as the Moulinex, Kenwood, Hamilton Beach, Iona or Osterizer blenders.

Another suitable method of applying shear is by forcing the composition by impellers through a screen, for instance as in a Silverson mixer or other mixer having a similar method of operation. For instance, there may be an impeller 4 to 10 cm in diameter rotating at 1500 to 6000 rpm to force the solution under high shear through a screen. Preferably a Silverson 120L mixer is used and has a square hole high shear screen and an impellor of 6.8 cm diameter rotating at 3000 rpm.

True homogenisers, in which a liquid is forced through a very small gap while subjected to a very fast chopping action, may apply too much shear and may result in substantial reduction of IV. Similarly if shear is applied for too long, it may eventually cause a decrease in IV. The shear must be such that the IV is increased by the process, generally to a value above 4.

The duration of the application of shear will depend upon the amount of shear that is being applied and methods that apply lower amounts of shear will require longer durations of shear in order to raise IV and/or convert the rheology to the desired long rheology.

The aqueous composition is generally made by mixing dry or aqueous gel particles of the polymer with water. These particles may be dry gel particles formed by gel polymerisation followed by comminution and drying and may have particle sizes up to, for instance, 3 mm, preferably not more than 1200 microns, and compositions of these should preferably be sheared before use in order to form a true solution. Preferably however the particles have a dry particle size of below 10 $\mu$m, preferably below 2 $\mu$m and have been made by reverse phase polymerization or emulsion polymerisation. Emulsion polymerisation is suitable for monomers, such as certain amino monomers, which are soluble only in acidic water. These fine particles may be introduced suspended in the liquid medium in which they are made and may then be dry or aqueous gel particles or they may be dry powder, preferably agglomerated into pellets to reduce dusting.

The shear can be applied while the particles of the short rheology polymeric material are still dissolving (i.e., going into equilibrium with) dilution water and so the formation of the composition and the conversion of the rheology may be conducted simultaneously. Preferably however the shear is applied to a preformed stable homogeneous composition (as defined above), i.e., after the short rheology polymeric material has gone into equilibrium with the water. Typically this requires an ageing period of at least 30 minutes, often 1 to 5 hours and most usually about 2 hours. During ageing, the composition may be static or may be subjected to agitation, often gentle stirring.

The amount of polymeric material in the solution is generally below 3% by weight as otherwise the viscosity of the solution may be unacceptably high, at least at the end of the shearing.

If the composition is more concentrated than is desired for addition to the aqueous suspension, it may be diluted after shearing.

The sheared composition is generally added to the aqueous suspension in amounts and by techniques that are conventional for linear high molecular weight flocculants and the flocculation process may be conducted in conventional manner. Generally there is little or no agitation of the suspension during the addition of the polymer and during flocculation, as is conventional. The flocculated solids are generally removed by dewatering. Dewatering can be effected under shear, for instance on a centrifuge, filter press or belt press but it is often preferred for the suspension to be dewatered substantially without shear. For instance dewatering may be by sedimentation or by filtration, for instance under vacuum or low pressure. Dewatering substantially without shear is of particular value when substantially all the shear is applied before adding the polymeric material to the suspension and the polymeric material, when added to the suspension, has IV above 6. If the sheared polymer still has significant cross linking at the time when it is added to the suspension (e.g., absolute ionic regain, defined below, above 20% or 30%), the flocculation is preferably conducted under shear, as described in more detail below, but this shear need not cause a further rise in IV.

The aqueous medium that is sheared can be the suspension that is to be flocculated. Thus instead of or in addition to increasing IV by shearing the composition before addition to the suspension, it is also possible to apply some or all of the shear, that is required to increase IV, to the suspension after addition of the polymeric material. In general, when the polymeric material that is added to the suspension still contains a substantial degree of cross linking it is desirable to subject the suspension to shear after addition of the polymeric material. For instance when the polymeric material has rather low IV, typically IV below 4, at the time of addition to the suspension it is generally desirable to shear the suspension and this shearing preferably is sufficient to increase IV to above 6.

Accordingly, in the invention some or, less preferably, all of the shear necessary to achieve the desired rheology and/or IV can be applied after addition to the suspension. Thus a composition of cross linked polymer having short rheology can be formed by stirring in conventional manner (e.g., as described above), but without the application of significant shear, and this composition can then be added to the suspension and the suspension can then be subjected to shear sufficient to convert the polymer to the desired rheology and/or the desired IV.

Shear that is applied to a suspension to which the cross linked polymeric material has been added, either with or without prior shearing, can be applied by apparatus such as is used for applying shear to the polymer composition or can be applied as part of the flocculation process. For instance the suspension containing the added polymer may be passed through a high speed mixer, for instance in line to the final dewatering step. For instance in the production of paper and board the cross linked polymer may be added at an early stage in the pulp flow line so that the act of pumping the flocculated dispersion along the flow line towards the drainage or other dewatering stage involves the application of shear to the flocculated pulp. Alternatively, the suspension may be sheared in line as it approaches a centrifuge, filter press or belt press or other dewatering stage.

The shear may be applied during a dewatering process that is conducted under shear, preferably a centrifugal dewatering stage but alternatively a filter press or belt press dewatering stage.

The shear may also be applied solely or partly by prolonged agitation of the flocculated suspension, for instance as the suspension is transported along a pipe or held in a reaction vessel. For instance the suspension can be a flocculated catalyst, for instance it can be a copper catalyst in an acrylonitrile hydrolysis reaction medium for the production of acrylamide.

Processes in which shear is applied to the suspension after adding cross linked polymer can have certain process advantages. The flocs tend to have higher floc strength than is normally obtainable with truly linear flocculants and so can be sheared to a smaller, stable, size substantially without redispersion of the solids. The flocs tend to be larger than with conventional linear flocculants. The optimum dose can best be determined by ascertaining the dose that gives largest floc size and using this dose ±50%, preferably ±20%.

Although higher dosages of the polymer are generally required, the risk of overdosing the suspension is generally reduced as the suspension is more tolerant of a wide range of doses. Similarly, satisfactory results can be achieved even if the quality of the suspension changes, for instance due to variable metal content.

Particular processes in which a cross linked polymer is added to a suspension to cause flocculation and the suspension containing the polymer is subjected to shear are described in our application Ser. No. 855,509 filed even date herewith.

Various methods of measuring the ionicity of a polymer are known. When the polymer is cationic, an anionic test reagent is normally used and when the polymer is anionic, a cationic reagent is normally used. For instance the ionicity of a cationic polymer can be determined by the method described in BP No. 1,579,007 or can be measured by Colloid Titration as described by Koch-Light Laboratories Limited in their publication 4/77KLCD-1. If the polymer has a measurable ionicity value, the shearing that is applied to the polymer is preferably such that the ionicity of the polymer undergoes a regain of at least 15%, preferably at least 30% and usually at least 50% as a result of the shearing. The regain is calculated as $(X-Y)/X \times 100$ where X is the ionicity after the shearing that is conducted in the process of the invention and Y is the ionicity of the unsheared polymer.

If the polymer has measurable ionicity when applying a standard, constant, shear, the absolute ionic regain (IR) calculated on the same formula (except that X is the ionicity after shearing to a substantially constant ionicity) can be determined. Preferably the polymer has, before shear, an absolute IR value of at least 40% and usually above 60%. After the shearing of the invention, it preferably has an absolute IR value below 10% if flocculation is to be performed without shear but may have a selected higher value, e.g., 25 to 70%, if flocculation is to be performed with shear.

The absolute IR value is determined by forming a 1% solution of the polymer in deionised water, allowing this to age for 2 hours and then further diluting it to 0.1% active polymer. The ionicity of the polymer before shearing Y is measured and the ionicity X is then determined by measuring ionicity by the same technique but after subjecting the solution to a standard degree of shear.

The shear for this test is best applied to 200 ml of the solution in a substantially cylindrical pot having a diameter of about 8 cm and provided in its base with rotatable blade above 6 cm in diameter, one arm of the blade pointing upwards by about 45 degrees and the other downwards by about 45 degrees. The blade is about 1 mm thick and is rotated at 16,500 rpm in the base of the pot for a prolonged period. These conditions are best provided by the use of a Moulinex homogeniser but other satisfactory conditions can be provided using kitchen blenders such as Kenwood, Hamilton Beach, Iona or Osterizer blenders or a Waring Blendor.

In practice, when determining the absolute value IR of the polymer that is to be sheared the precise conditions of shear are relatively unimportant since, provided the degree of shear is of the same order of magnitude as specified, it will be found that IR is not greatly affected by quite large changes in the amount, for instance the duration, of shear, whereas at lower amounts of shear (for instance 1 minute at 16,500 rpm) IR is greatly affected by small changes in shear. Conveniently therefore the value of X is determined at the time when, with a high speed blade, further shear provides little or no further change in ionicity. This generally required shearing for 10 minutes, but sometimes longer periods, e.g., up to 30 minutes with cooling, may be desired.

The polymers for which ionicity values are best determined are dialkylaminoalkyl (meth) acrylate polymers (including acid addition and quaternary ammonium salts copolymerised with 0–95% acrylamide or other non-ionic monomers) and so these are one preferred class of polymers for use in the invention.

The polymers may, in general, be formed from any suitable water soluble monomer or monomer blend. The monomers may be non-ionic but generally part at least of the monomer used for forming the polymer is ionic. The monomers are normally monoethylenically unsaturated monomers, sometimes allyl monomers but generally vinyl monomers. They are generally acrylic (including methacrylic) monomers.

Suitable non-ionic monomers are acrylamide, methacrylamide, N-vinylmethylacetamide or formamide, vinyl acetate, vinyl pyrrolidone, methyl methacrylate or other acrylic (or other ethylenically unsaturated) ester or other water insoluble vinyl monomers such as styrene or acrylonitrile.

Suitable anionic monomers are sodium acrylate, methacrylate, itaconate, 2-acrylamido 2-methyl propane sulphonate, sulphopropylacrylate or methacrylate or other water soluble forms of these or other polymerisable carboxylic or sulphonic acids. Sulphomethylated acrylamide, allyl sulphonate, or sodium vinyl sulphonate may be used.

Suitable cationic monomers are dialkylaminoalkyl acrylates and methacrylates, especially dialkylaminoethyl acrylate, and their quaternary or acid salts, and dialkylaminoalkyl acrylamides or methacrylamides and their quaternary or acid salts, for instance methacrylamido-propyl trimethyl ammonium chloride and Mannich products such as quaternised dialkylaminomethyl acrylamides. Alkyl groups are generally $C_{1-4}$ alkyl.

The monomers can contain hydrophobic groups, e.g., as described in EPO No. 172723A2 for instance on page 10. If the monomer is to impart insolubility to the polymer, the ethoxy chain should be short or absent, i.e., $n=0$. The allyl ether monomers are especially preferred.

Polymers made from pure monomers in the absence of cross linking agent will normally form polymers having a long rheology but if the monomers are contaminated with significant amounts of cross linking agent or if cross linking agent is added to the monomers or if the polymer is cross linked by, for instance, excessive heating during drying, such polymers may have a short rheology and are then suitable for use in the invention.

Cross linking may occur after polymerisation, for instance by reaction of two counterionic soluble polymers or by reaction with formaldehyde or a polyvalent metal compound. Often cross linking occurs during polymerisation due to the addition of cross linking agent, for instance to the polymerisation mixture. Added cross linking agents can include ionic cross linking agents such as polyvalent metal salts, formaldehyde, glyoxal or, preferably, covalent cross linking agents that will copolymerise with the monomers, preferably diethyleneically or polyethylenically unsaturated monomers of the type conventionally used for cross linking water soluble polymers, for instance methylene bis acrylamide or any of the other known acrylic cross linking agents. The amount of methylene bis acrylamide is generally below 100 ppm and equivalent amounts of other cross linking agents may be used.

The invention is of particular value when the polymer is a Mannich base polymer, preferably as the free base, thus being a dialkyl amino methyl (meth) acrylamide polymer. Mannich bases are notorious for spontaneously cross linking on storage for more than a few hours, especially when they are in relatively concentrated form, typically above 10 or 20% by weight polymer based on polymer plus water, or when they are dried to form a powder. For instance, an emulsion of gel particles of above 30% Mannich base with less than 70% water is usually considered unusable in conventional processes after one day's storage. Similarly, any attempt at removing all the water from the emulsion particles, or of making a dry polymer in some other way, generally renders the polymer unusable in conventional processes. By the invention, however, very effective flocculation performance can be achieved. The polymer can be sheared and then used in a low shear process or it can be used without prior treatment in a high shear flocculation process. The invention includes these processes even if IV is not observed or not increased during the process, and when operated using other high IR polymers instead of Mannich polymers.

The Mannich base units in the polymer may be copolymerised with other monomers, for instance acrylamide or other non-ionic or ionic monomer, in any desired proportions. The invention is also valuably applied to other polymers that are particularly liable to spontaneous cross linking including sulphomethylated polyacrylamides and polymers including units selected from (A) $CH_2=CR^1.CO.X.CH_2.CHOH.CH_2NR_2$
(B) $CH_2=CR^1.CO.NH.CH_2.CH_2OH$
(C) $CH_2=CR^1.CO.NH.CH_2.COOH$ wherein $R^1$ is hydrogen or methyl and each group $R_2$ is $C_{1-4}$ alkyl, usually methyl or ethyl and X is O or NH. Units of the formulae B and C are usually produced as glyoxal derivatives of polyacrylamides and so are usually copolymerised with acrylamide and optionally one or more other ethylenically unsaturated monomers. Polymers formed from units A are glycidyl derivatives of acrylamide or acrylic acid and are generally copolymerised with acrylamide and/or one or more other ethylenically unsaturated monomers. They are generally present as the quaternary ammonium salt formed with any suitable quaternising group such as methyl chloride or dimethyl sulphate.

The polymers may be made by any convenient polymerisation method including solution, gel, precipitation, emulsion or reverse phase polymerisation (either by emulsion or suspension kinetics).

BRIEF DESCRIPTION OF THE DRAWINGS

The accompanying drawings are graphs of the results obtained in Example 3.

The following are some examples of the invention. In every instance, the polymer had a specific viscosity well above 100, with the un-cross linked polymers having specific viscosity above 1000. Every polymer, upon shearing to maximum IV, had IV above 4.

EXAMPLE 1

A range of copolymers of 42% w/w methyl chloride quaternised dimethylaminoethyl acrylate, 58% w/w acrylamide were prepared by gel polymerisation from substantially pure monomers and with various additions of methylene bisacrylamide (mba) as cross linker. They were then dried in air at a maximum temperature of about 40° C.

Each powdered product was dissolved in water with 2 hours mixing. Cationicity regain was measured applying standard shear, using the technique described above, and the sheared product had long rheology. The CST value was recorded at a dose of 60 g/m³ polymer on a digested primary activated sewage sludge after mixing the polymer for 25 seconds using a modified Triton stirrer timer type 131. CST was recorded for a 0.1% solution before any shearing and also for the 0.1% solution that had been subjected to the described standard shear. The results are shown in Table 1a.

TABLE 1a

| Product | Add MBA | Cationicity Before Shear | Cationicity After Shear | Regain | Rheology Before Shear | CST Before Shear | CST After Shear |
|---|---|---|---|---|---|---|---|
| 1 | 0 ppm | 1.46 | 1.52 | 4.3 | long | 130 | 151 |
| 2 | 1 ppm | 1.29 | 1.48 | 13.2 | short | 226 | 169 |
| 3 | 2 ppm | 0.78 | 1.46 | 46.4 | short | 276 | 162 |
| 4 | 3 ppm | 0.48 | 1.43 | 66.4 | short | 341 | 166 |

TABLE 1a-continued

| Product | Add MBA | Cationicity Before Shear | Cationicity After Shear | Regain | Rheology Before Shear | CST Before Shear | CST After Shear |
|---|---|---|---|---|---|---|---|
| 5 | 5 ppm | 0.42 | 1.45 | 71.2 | short | 449 | 163 |

From Table 1a, it will be apparent that products 4 and 5, having totally unsatisfactory rheology by normal standards give very poor CST values without shearing but all the products after shearing give similar CST values that are similar to the value of the long rheology in cross linked product 1 before shearing. The IV of the products before shear was measured (for the soluble component) on the filtrate of an aqueous composition of the polymer, and the IV of the product after standard shear was measured on the product obtained by shearing the entire starting product (including insoluble component). The results are shown in Table 1b.

TABLE 1b

| Product | MBA | IV before shear | IV after shear |
|---|---|---|---|
| 1 | 0 ppm | 12.8 | 5.3 |
| 2 | 1 ppm | 6.4 | 6.0 |
| 3 | 2 ppm | 3.4 | 5.9 |
| 4 | 3 ppm | 2.5 | 6.0 |
| 5 | 5 ppm | 1.8 | 5.8 |

This shows how standard shear reduces the IV of a truly soluble, linear polymer but increases the IV of the more cross linked polymers to about the same value.

EXAMPLE 2

A Mannich emulsion is made by mixing 133 parts of a dispersion of 53.2% active polyacrylamide in Pale Oil 150 containing emulsifier and dispersion stabiliser with 120 parts of Exsol (a trade mark of Exxon and indicating a D230/260 cut of a hydrocarbon oil), 10 parts of an amphipathic polymeric stabiliser, 75 parts of a 60% by weight dimethylamine solution, 75 parts of a 40% by weight formaldehyde solution together with 12 parts of emulsifier. The addition is conducted with vigorous stirring and reaction is left to go to equilibrium. The product is a 30% active emulsion of polyacrylamide Mannich free base dispersed in oil.

This emulsion was tested on day 1, its day of manufacture, and on sequential days thereafter. The tests consisted of using the emulsion to make a 1% solution. Part of the solution was used for CST tests on digested sewage sludge pH 6 and part was subjected to 10 minutes shear in an Iona blender, approximating to the standard shear conditions measured above.

Both the day 1 Mannich samples and all the sheared samples had rheology above 5 cm but the remaining unsheared Mannich samples had rheology below 2 cm.

The CST values were recorded at various dosages and mixing conditions and the average CST was calculated.

The commercial material Zetag 94 was used as a standard. "Zetag" is a trade mark of the Allied Colloids, Ltd. It had constant rheology, above 5 cm, throughout the experiment.

The CST results are given in Table 2a. Low values are preferred. The IV values before and after shearing and the IR values are given in Table 2b.

TABLE 2a

| Product | Day 1 | Day 2 | Day 3 | Day 4 | Day 5 |
|---|---|---|---|---|---|
| Mannich (A) | 61 | 173 | 303 | 404 | 592 |
| Sheared Mannich (B) | 59 | 41 | 53 | 111 | 191 |
| Zetag 94 (C) | 67 | 51 | 61 | 71 | 77 |

TABLE 2b

|  | Day 1 | Day 2 | Day 3 | Day 4 | Day 5 |
|---|---|---|---|---|---|
| IV Product A | 10.1 | 4.1 | 2.3 | 1.9 | 1.4 |
| IV Product B | 10.5 | 9.0 | 6.1 | 4.3 | 3.2 |
| IR Product A | 12.3 | 59.9 | 62 | 57 | 43 |

It is apparent that the Mannich emulsion changes adversely with storage and that the short rheology polymers are unsatisfactory but that the described shearing, to give long rheology, greatly restores the properties.

EXAMPLE 3

To determine the effectiveness in a flocculation process that is conducted under shear, flocculation performance is determined by visual observation on a laboratory centrifuge consisting of a cylindrical solid bowl closed at its base and open at its top but with an inwardly extending lip around its periphery. The bowl runs at 2,000 rpm and is, at this speed, filled with water (400 ml). Sewage sludge to which flocculant polymer solution has previously been added in conventional manner is fed at constant rate into the bowl while it is spinning. Some of the solid is trapped in the bowl whilst the remainder passes out in the overflow, as the centrate. Since the flocculated suspension is accelerated, in a very short period of time, to 2,000 rpm this centrifugal system of dewatering applies very high shear to the flocculated suspension. Best results are those wherein there is maximum retention of solids in the bowl, with least suspended solids content in the centrate.

Figure 1A:
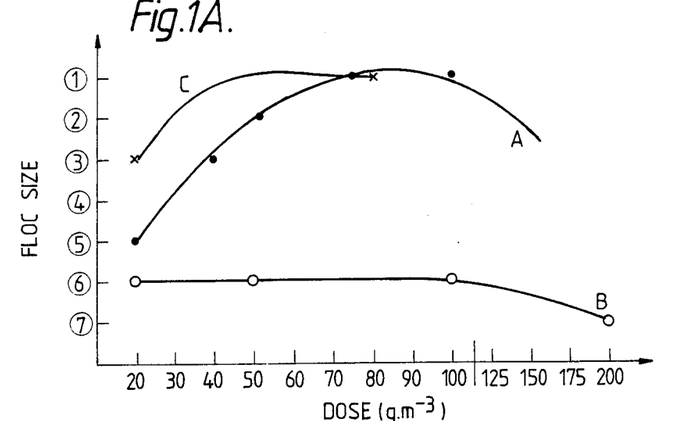
Figure 1B:
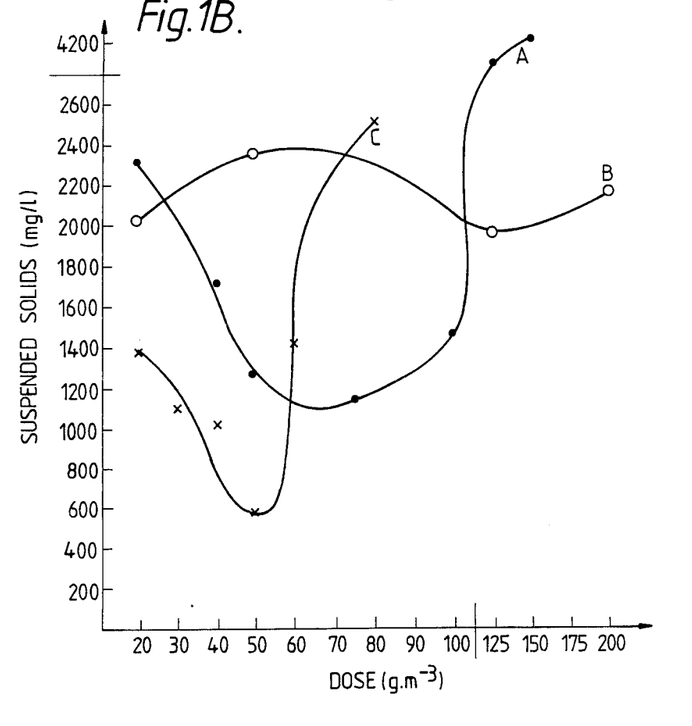
Figure 2A:
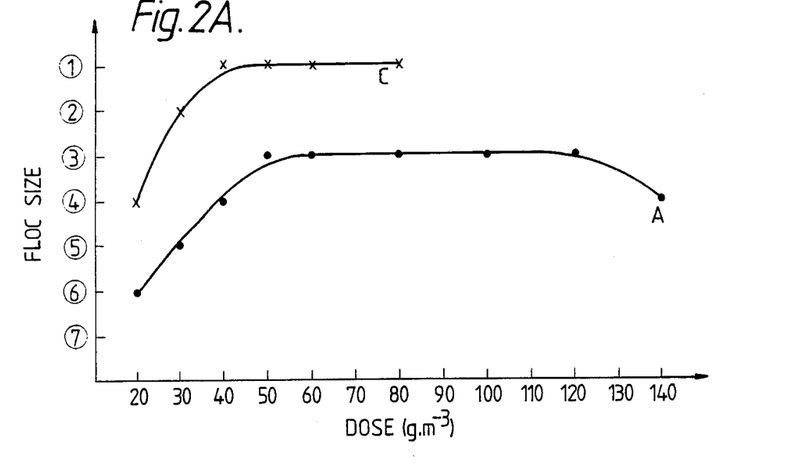
Figure 2B:
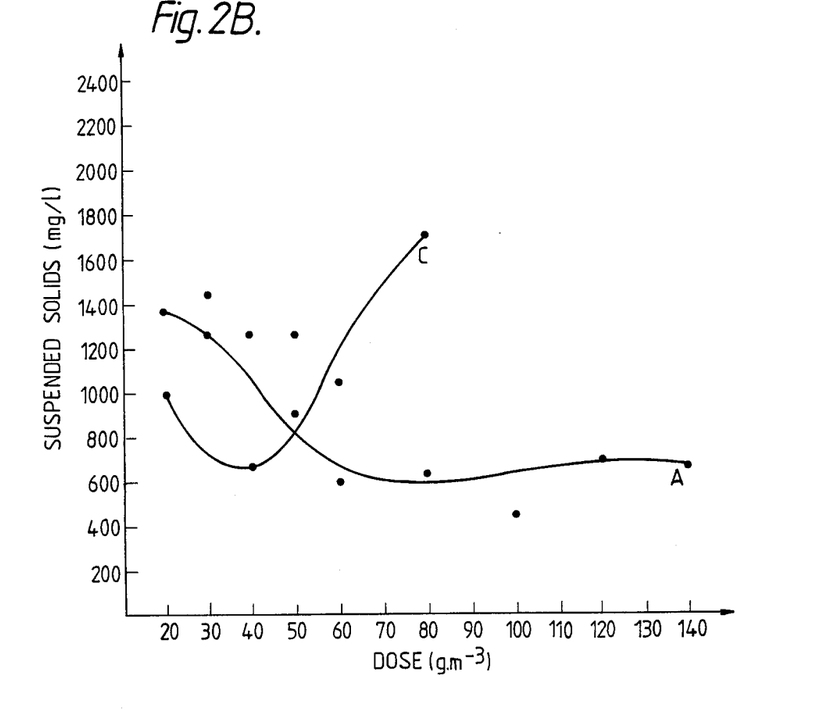
Figure 3A:
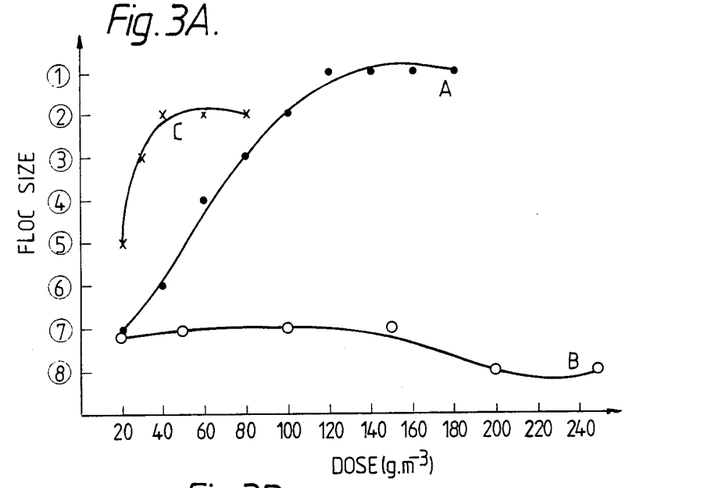
Figure 3B:
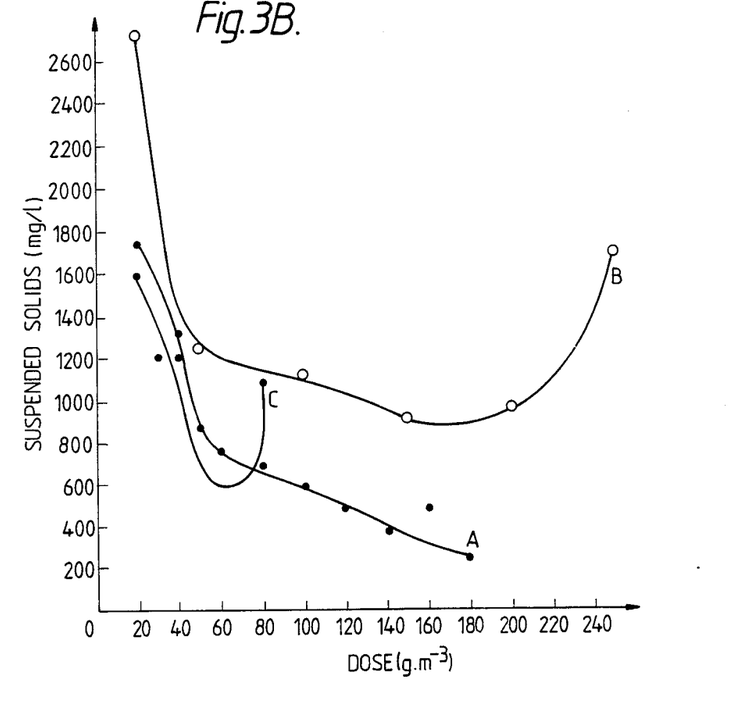
Figure 4A:
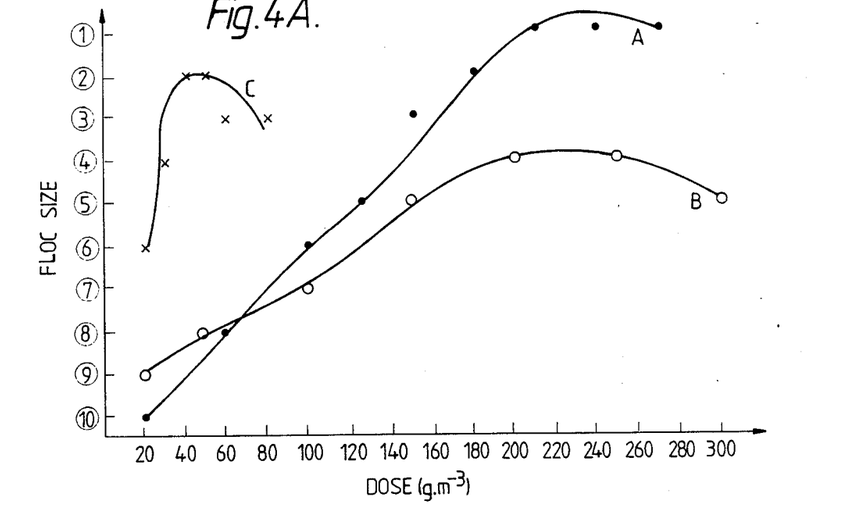
Figure 4B:
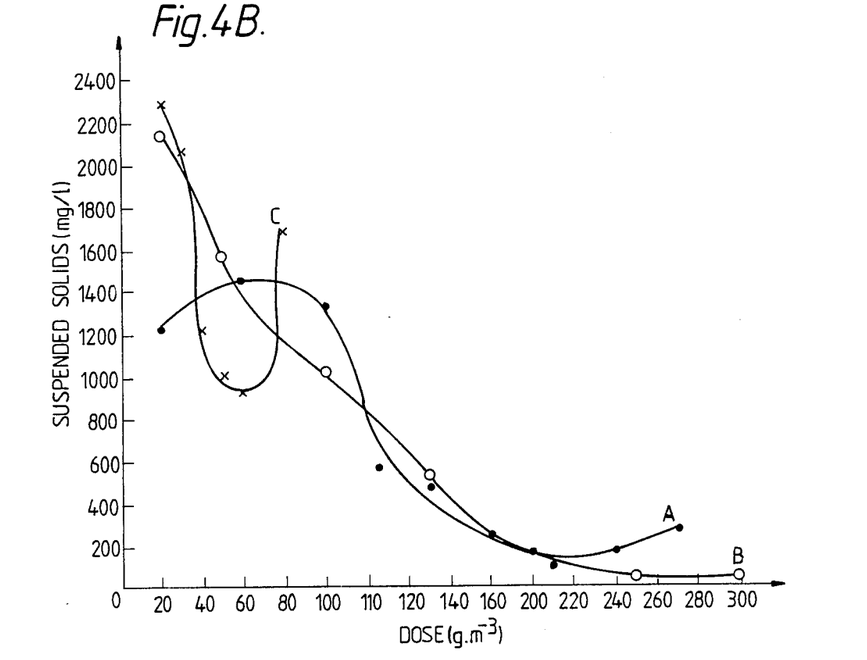

The emulsions before and after shear obtained in Example 2 were subjected to this test, at various dosages. The floc size at various dosages was estimated on a scale of 1 to 10, 1 being the largest and the suspended solids in the centrate were recorded, all at various dosages of flocculant. The results are shown in the accompanying drawings.

In the accompanying drawings:

FIGS. 1A, 2A, 3A and 4A are graphs showing the relationship between dose (grams per cubic meter) and floc size (assessed on a scale of 1 to 7 where 1 is the largest) for the test samples A, B, C on, respectively, Day 1, Day 2, Day 3 and Day 4.

FIGS. 1B, 2B, 3B and 4B are graphs showing the relationship between dose (grams per cubic meter) and suspended solids (mg/l) in the centrate from the centrifuge for the test samples A, B, C on, respectively, Day 1, Day 2, Day 3 and Day 4.

The unsheared Day 1 sample A is less dose-sensitive than the standard C but slightly less efficient. The sheared sample B is less efficient. The unsheared Day 2 sample A is slightly more efficient than the standard C and is very dose tolerant. The unsheared Day 3 sample A gives greatly improved results compared to the standard C. The sheared sample B is slightly less effective than the standard C but very dose tolerant. The sheared and unsheared Day 4 samples A and B are both much more effective and dose tolerant than the standard C.

EXAMPLE 4

A range of anionic copolymers, having composition 40 wt% sodium acrylate, 60 wt% acrylamide, were prepared from monomer mix containing different amounts of methylene bis acrylamide, by reverse phase suspension polymerisation. The degree of cross linking incorporated into each copolymer increased in proportion to the amount of MBA in the monomer as indicated by depression of the intrinsic viscosity.

The above products were evaluated on coal fines in simulation of dewatering by belt filtration. This involved treating 400 cm³ portions of the coal fines with a solution of the flocculant followed by stirring for 120 seconds to apply shear and to induce flocculation. The stirring was by a Heidolph stirrer on setting 2 using a gate stirrer in a 600 cm³ beaker. The flocculated fines were then transferred to the belt press simulator and dewatered under the influence of pressure which was gradually increased to 1.6 bar. On completion of the dewatering cycle, the cake was removed for dry solids determination and calculation of the yield.

The MBA content, IV, results for cake solids and yield at the optimum dose established for each product are shown in Table 3.

TABLE 3

| Product | MBA content (ppm of polymer) | I.V. (dl/g) | Optimum Dose (mg/l) | Cake Solids (%) | Yield (%) |
|---|---|---|---|---|---|
| AA | 0 | 18.5 | 100 | 61.5 | 85.2 |
| BA | 2.71 | 14.3 | 150 | 60.0 | 85.8 |
| CA | 6.76 | 11.3 | 400 | 60.8 | 90.0 |
| DA | 13.53 | 6.6 | 500 | 57.8 | 86.6 |
| EA | 20.29 | 5.5 | 600 | 59.8 | 92.6 |
| FA | 27.06 | 2.7 | 800 | 59.8 | 92.4 |
| GA | 40.53 | 3.1 | 1200 | 58.6 | 93.7 |
| HA | 67.60 | — | 1600 | 59.1 | 89.4 |
| IA | 135.30 | — | 1600 | 59.7 | 84.9 |

It can be seen that as the degree of cross linking increases, the general trend is for improvement in yield. Products HA and IA demonstrate decreasing yield either because they are too cross linked to be effective or the optimum dose has not been attained.

EXAMPLE 5

An emulsion in oil of polymeric particles below 2 μm in size is made by reverse phase polymerisation of a blend of 40% acrylamide and 60% MeCl diethylaminoethyl acrylate and methylene bis acrylamide in an amount sufficient to raise IR from near zero to between 35 and 40.

The emulsion is added to water with stirring and allowed to age to provide a stable composition. The rheology is very short, below 1 cm.

The composition is then added at a polymer dose of about 6 kg/t total solids to an aqueous suspension that is flowing towards a commercial sewage dewatering cetrifuge, the treated suspension is sheared in a Inline Mixer to reduce floc size without redispersing solids as discrete solids, and the sheared product is then dewatered in the centrifuge. The solids content of the centrate is typically below 0.2% (0% is ideal) and the degree of separation is above 98% (100% is ideal). When the process is repeated using un-cross linked polymer, the corresponding values are typically above 1% and below 75%.

EXAMPLE 6

The copolymers of 58% acrylamide and 42% dimethylaminoethyl acrylate quaternised with methyl chloride (DMAEA MeCl) and 5 and 12.5 ppm methylene bis acrylamide were prepared by reverse phase polymerisation to give a particle size below 2 μm followed by azeotropic distillation. The specific viscosities of the two polymers at 0.5% concentration in water at 35° C. were 750 and 3000 respectively.

0.1% aqueous solutions of the products were sheared using a Silverson Mixer Mold number L2R. The intrinsic viscosity (dl/g) of the polymers were measured as the shearing progressed. The results are shown in Table 6.

TABLE 6

| Time | IV 5 ppm MBA | IV 12.5 ppm MBA |
|---|---|---|
| 0 mins | 4.5 | 2.82 |
| 0.25 | 5.3 | 3.5 |
| 0.5 | 5.9 | 3.4 |
| 1.0 | 6.1 | 3.6 |
| 2.5 | 7.3 | 3.6 |
| 5.0 | 7.2 | 4.3 |
| 10.0 | — | 5.0 |

This clearly shows how IV increases as shearing proceeds.

EXAMPLE 7

A copolymer was made as in Example 6 except that the amount of MBA was 30 ppm. IV was 2.8 and IR 55. The reverse phase dispersion was mixed with water and aged, to give a stable 0.1% composition. This was sheared in a Waring Blendor until IV was 5 dl/g and IR was 21. This was then used as an effective flocculant for sewage sludge at a dose of 120 g/m$^3$.

We claim:

1. A flocculation process for suspended solids in an aqueous suspension comprising, adding a polymeric material to water to form an aqueous composition, adding the aqueous composition to said aqueous suspension to flocculate the suspended solids of the suspension, wherein the polymeric material is subjected to shear in the aqueous composition before addition to the suspension or is subjected to shear during flocculation of the suspension and the polymeric material comprises cross linked water swellable polymer that is sheared to an intrinsic viscosity of at least 4 dl/g that is formed from a water soluble monomer or blend of water soluble monomers and the aqueous composition of the polymeric material is selected from (a) compositions that are a stable homogeneous composition and the shearing causes an increase in intrinsic viscosity of at least 1 dl/g, (b) compositions that will become a stable homogeneous composition upon ageing or stirring and the shearing causes an increase in intrinsic viscosity of at least 1 dl/g, and (c) compositions that include non-dispersible, insoluble, polymer and the shearing converts it to a stable homogeneous composition.

2. A process according to claim 1 which a 1% by weight stable aqueous homogeneous composition of the polymeric material has a rheology of below 2 cm before the shearing and a rheology of above 5 cm after the shearing.

3. A process according to claim 1 in which the aqueous composition is formed by adding to water the polymeric material in the form of dry or gel particles having a size below 10 microns.

4. A process according to claim 1 in which the polymeric material is insoluble in water, has a particle size below 3 mm and is subjected to shear to form a stable homogeneous aqueous composition that has intrinsic viscosity above 4 dl/g and that is then added to the suspension.

5. A process according to claim 1 in which the polymeric material is formed from one or more water soluble monoethylenically unsaturated monomers selected from non-ionic monomers, anionic monomers containing a carboxylic group or a sulphonic acid group and cationic monomers that are dialkylaminoalkyl(meth)acrylates or dialkylaminoalkyl(meth)acrylamides.

6. A process according to claim 1 in which the polymer is a Mannich base polymer.

7. A process according to claim 1 in which the polymeric material undergoes an ionicity regain $(X-Y)/X \times 100$ where X is the ionicity after the shearing and Y is the ionicity before the shearing) due to the shear of at least 30%.

8. A process for flocculating suspended solids in an aqueous suspension comprising, forming an aqueous composition of a crosslinked water swellable polymeric material which has an absolute ionicity regain value $(X-Y)/X \times 100$ (where X is the ionicity after shear to constant ionicity and Y is the ionicity before shear) and includes recurring units selected from Mannich base monomer, sulphomethylated acrylamide, $CH_2=CR^1.CO.X.CH_2.CHOH.CH_2NR_2$, $CH_2=CR^1.CO.NH.CH_2.CH_2OH$ and $CH_2=CR^1.CO.NH.CH_2.COOH$, wherein $R^1$ is hydrogen or methyl, each group $R^2$ is $C_{1-4}$ alkyl and X is O or NH, shearing said aqueous composition to an intrinsic viscosity of at least 4 dl/g, wherein said shearing causes an increase in said intrinsic viscosity of at least 1 dl/g, adding a flocculating amount of said aqueous composition to said aqueous suspension and dewatering the resultant flocculated suspension on a centrifuge.

9. A flocculation process for suspended solids in an aqueous suspension comprising, forming an aqueous composition of cross linked water swellable polymeric material from a water soluble monomer or blend of water soluble monomers, adding a flocculating amount of said aqueous composition to said aqueous suspension of suspended solids and flocculating the suspended solids, wherein the intrinsic viscosity of the polymeric material is increased by shearing the aqueous composition or the suspension after the addition of the aqueous composition or both, and the said shearing increases the intrinsic viscosity of the polymeric material by at least 1 dl/g to a value that is at least 4 dl/g.

10. A process according to claim 9 in which the aqueous composition is a stable aqueous homogeneous composition and the polymer before shearing has intrinsic viscosity below 4 and is increased by shearing to above 6 and the shearing increases intrinsic viscosity by at least 1 dl/g.

11. A process according to claim 9 in which the intrinsic viscosity of the polymeric material is increased by subjecting the aqueous composition of polymeric material to shearing to form a stable aqueous homogeneous composition of the polymeric material, and the stable composition is then added to the suspension.

12. A process according to claim 11 in which the shearing is by blades moving at above 500 meters/minute.

13. A process according to claim 11 in which substantially all the shear is applied before adding the polymeric material to the suspension, the polymeric material has intrinsic viscosity above 6 when added to the suspension, and the suspension is dewatered substantially without shear.

14. A process according to claim 9 in which the polymeric material is added to the suspension and shear is applied to the suspension.

15. A process according to claim 9 in which shear is applied to the suspension by blades moving at above 500 meters per minute.

16. A process according to claim 9 in which the polymeric material has intrinsic viscosity below 4 when it is added to the suspension and the shearing gives an intrinsic viscosity above 6.

17. A process according to claim 9 in which the polymer includes recurring units selected from Mannich base monomer, sulphomethylated acrylamide, $CH_2=CR^1.CO.X.CH_2.CHOH.CH_2NR_2$, $CH_2=CR^1.CO.NH.CH_2.CH_2OH$ and $CH_2=CR^1.CO.NH.CH_2.COOH$, wherein $R^1$ is hydrogen or methyl, each group $R^2$ is $C_{1-4}$ alkyl and X is selected from O and NH.

18. A process according to claim 9 in which the polymer is formed from dialkylaminoalkyl(meth)acrylate copolymerised with 0 to 95 mole percent acrylamide.

19. A process according to claim 9 in which the polymeric material has an absolute ionicity regain value $(X-Y)/X \times 100$ (where X is the ionicity after shear to constant ionicity and Y is the ionicity before shear) of at least 40% before applying before the shear and below 10% after applying the shear.

20. A process according to claim 9 in which a 1% by weight stable aqueous homogeneous composition of the polymeric material has a rheology of below 2 cm before the shearing and a rheology of above 5 cm after the shearing.

21. A process according to claim 9 in which the aqueous composition is formed by adding to water the polymeric material in the form of dry or gel particles having a size below 10 microns.

22. A process according to claim 9 in which the polymeric material is formed from one or more water soluble monoethylenically unsaturated monomers selected from non-ionic monomers, anionic monomers containing a carboxylic group or a sulphonic acid group and cationic monomers that are dialkylaminoalkyl(meth)acrylates or dialkylaminoalkyl(meth)acrylamides.

23. A process according to claim 9 in which the polymer is a Mannich base polymer.

* * * * *